United States Patent
Cole

[15] 3,698,668
[45] Oct. 17, 1972

[54] VARIABLE CAMBER AIRFOIL

[72] Inventor: James B. Cole, Mercer Island, Wash.

[73] Assignee: The Boeing Company, Seattle, Wash.

[22] Filed: April 8, 1971

[21] Appl. No.: 132,452

[52] U.S. Cl. ................................................244/44
[51] Int. Cl. ...................................................B64c 3/48
[58] Field of Search......244/44, 46, 42 R, 42 C, 42 D

[56] References Cited

UNITED STATES PATENTS

| | | | |
|---|---|---|---|
| 2,650,047 | 8/1953 | Carhart et al. | 244/44 |
| 3,109,613 | 11/1963 | Bryant et al. | 244/44 |
| 3,361,386 | 1/1968 | Smith | 244/44 |

Primary Examiner—Milton Buchler
Assistant Examiner—Carl A. Rutledge
Attorney—Glenn Orlob and Kenneth W. Thomas

[57] ABSTRACT

A variable camber mechanism for an aerodynamic surface wherein a series of truss members are pivotally mounted on canted hinges and arranged in a general chordwise alignment of an aerodynamic surface. When the members are actuated through a screw-drive mechanism to rotate out of alignment, they provide a chordwise contraction force which through a slip jointed undersurface, in the case of an airplane wing, permits the shortening of that surface relative to the upper surface and thereby provides the desired camber to the aerodynamic surface.

7 Claims, 5 Drawing Figures

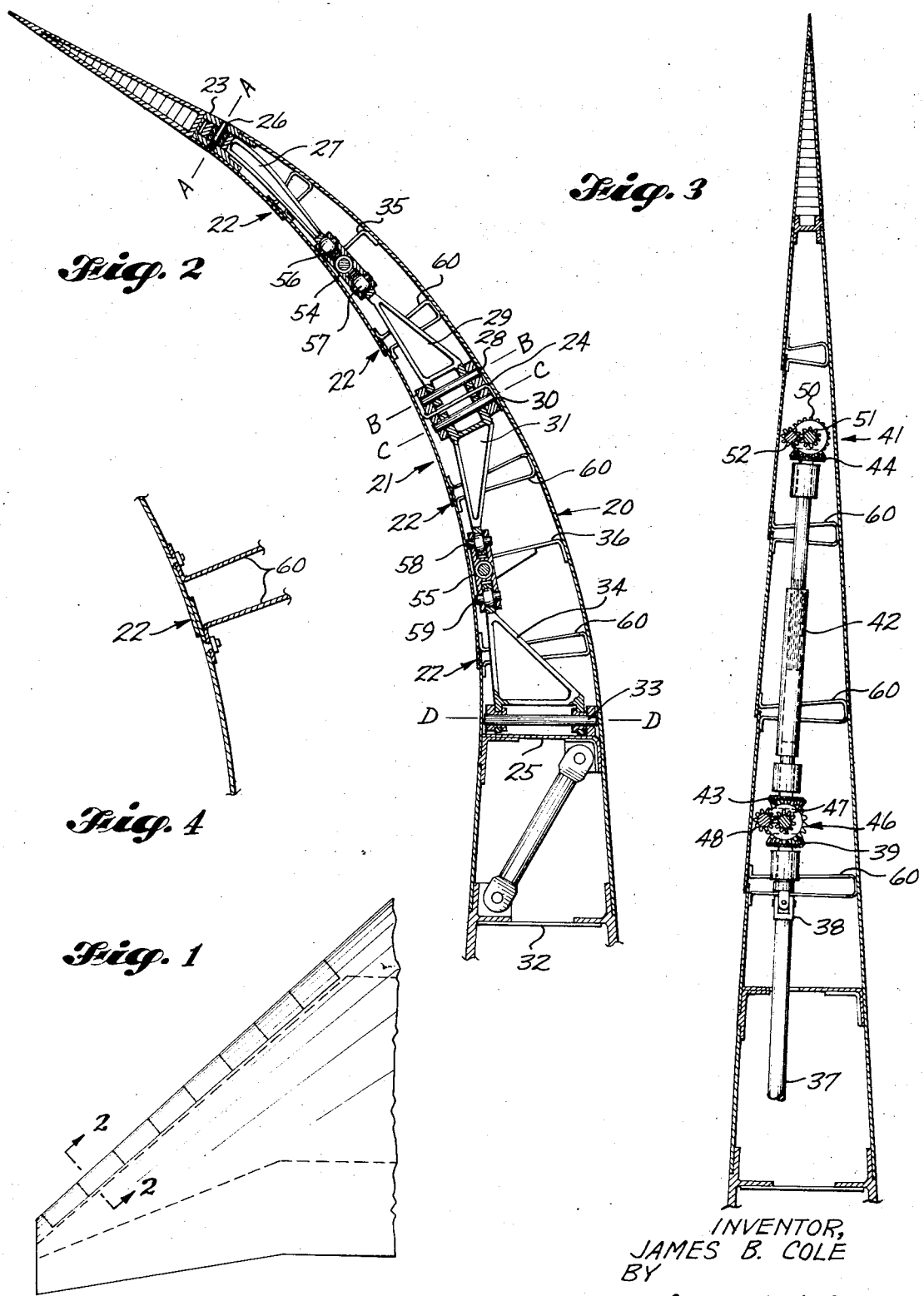

VARIABLE CAMBER AIRFOIL

SUMMARY OF THE INVENTION

The invention relates to a mechanism for cambering an aerodynamic surface to provide a variable airfoil contour and more particularly to a leading edge device for providing variable camber to a wing for supersonic aircraft so as to improve its aerodynamic performance and obtain improved lift characteristics for various air speeds and wing angles of attack.

The leading edge mechanism of the present invention is generally positioned forward of the front spar and comprises a series of trusswork members connected by canted hinges in a chordwise alignment or more specifically, normal to the wing leading edge. The upper surface of the wing is a continuous structural skin which carries the variable camber mechanism and the lower surface of the wing is substantially a nonstructural skin and is provided with slip joints to permit shortening of the lower surface relative to the upper surface. The truss members are actuated by a screw-drive system to rotate about canted hinges for producing an airfoil camber deflection toward the wing leading edge and also the truss mechanism provides structural rigidity to the deflected surface as long as it is held immobile by the screw-drive system. The mechanism for cambering the wing leading edge provides an infinitely variable camber to the wing; zero camber is provided for high speed flight, a slight camber for subsonic cruise, and very high cambers for landing and take-off flight modes.

Conventional high lift devices such as leading edge flaps and slats have been successfully employed on subsonic wings to improve their lift characteristics at low speeds such as during landing and take-off. These devices are not practical for application on thin sharp nosed supersonic airfoil section wing shapes because they are too bulky to be structurally contained within the limited wing envelope. Also, hinged leading and trailing edges have been employed on thin sharp nosed wings to increase the angle of attack at which the wing will stall at low landing and take-off speeds. Their effectiveness is limited by the sharp break in contour they produce at the hinge line. These devices also cause a break in the wing upper skin which produces a high speed drag penalty and skin erosion problems. Also, the mechanical drive mechanism for these hinged devices are generally subjected to maximum air loads and fatigue loads from turbulence. Stiffness and strength requirements become limiting factors for this design.

The object of the present invention is to provide smooth wing camber contouring to solve the problem of early air flow separation and wing stall associated with the sharp change in contour produced by most high lift devices at high angles of attack.

One of the advantages of the variable camber mechanism of the present invention is its mechanical advantage, in that it requires a relatively small force to actuate the surface which results in a much lighter system.

Another advantage is that it provides an infinite number of aerodynamic contours to optimize wing lift performance for various air speed and wing angle of attack combinations.

A further advantage is that it allows the critical wing upper skin surface to remain unbroken for all wing cambers; thereby, eliminating high speed drag and skin erosion problems associated with devices that require a break in the upper skin surface.

These, as well as other advantages of the invention, will be more clearly understood from the following description when read with reference to the accompanying drawings.

BRIEF DESCRIPTION OF THE DRAWINGS

FIG. 1 is a plan view of a swept back wing depicting the variable camber airfoil mechanism of the present invention in combination with the preferred embodiment of a supersonic wing leading edge.

FIG. 2 is an enlarged cross sectional view of the leading edge of FIG. 1 and shows in detail the variable camber mechanism actuated to the increased camber position.

FIG. 3 is an enlarged cross sectional view of the leading edge of FIG. 1 and shows in detail the drive mechanism and its arrangement with the wing in its uncambered position.

FIG. 4 is an enlarged cross sectional view of an overlapping slip-joint in the lower surface of the wing.

DESCRIPTION OF THE PREFERRED EMBODIMENTS

Figure 5:
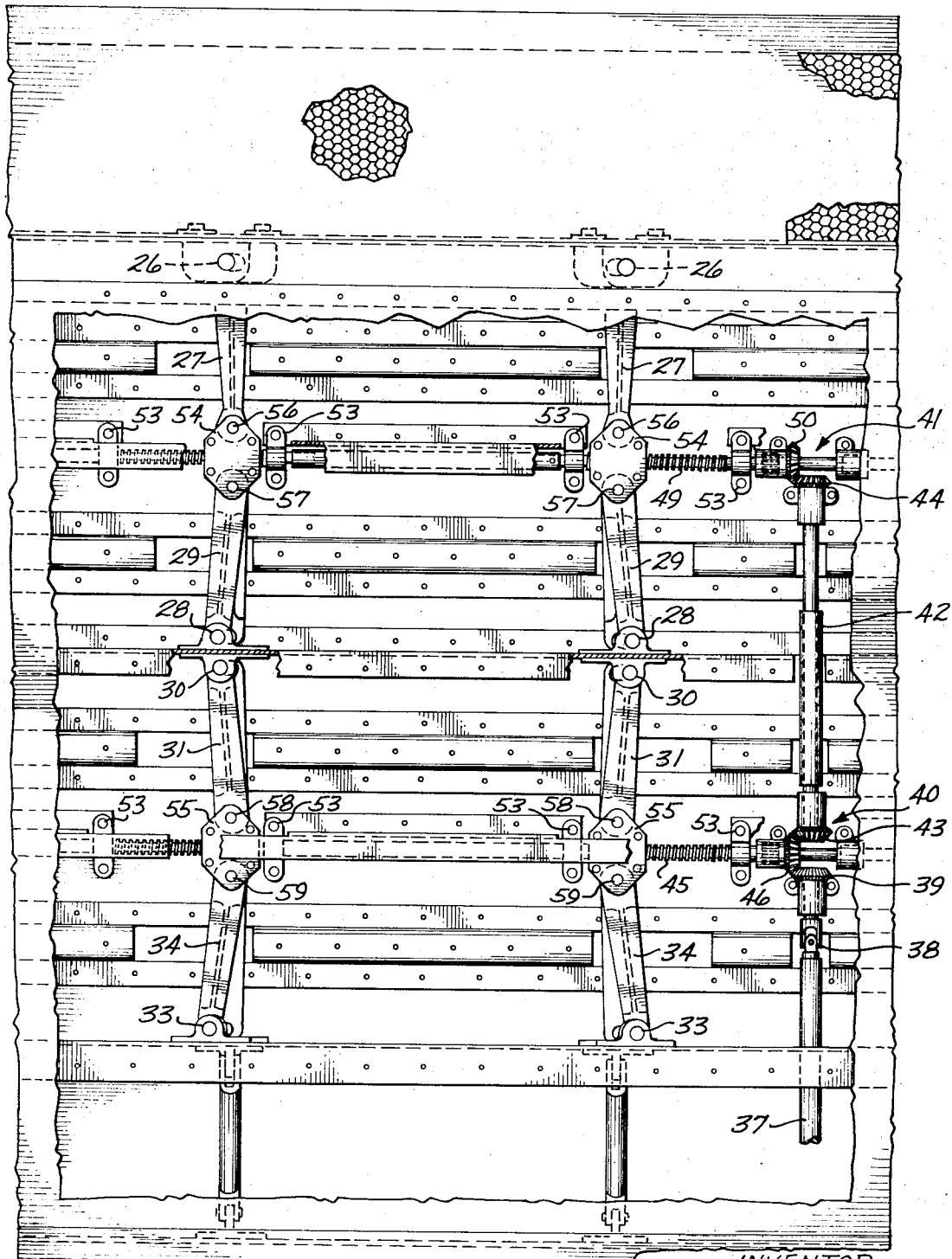
FIG. 5 is an enlarged plan view of the leading edge of FIG. 1 and shows in detail the variable camber mechanism as it would be arranged with the leading edge shown in FIG. 3, in the straight high speed or uncambered position.

With respect to the figures, the variable camber airfoil mechanism of the present invention incorporates a continuous structural skin panel 20 on the upper surface of the wing leading edge and a non-structural lower surface fairing assembly 21 incorporating a series of slip joints 22 to allow for contraction of the under surface.

The upper flexible surface 20 of the wing is rigidly fastened to the spanwise parallel beams 23 forward toward the wing leading edge, 24 mid, and 25 aft. The forward beam 23 structurally supports the forward canted hinge 26 and the forward truss arm 27, which is pivotally connected thereto for rotation about the canted hinge axis A—A. The mid beam 24 structurally supports the mid forward canted hinge 28 and the mid forward truss arm 29, pivotally connected thereto for rotation about the canted hinge axis B—B; the mid beam 24 also supports the mid aft canted hinge 30 and its mid aft truss arm 31, pivotally connected thereto for rotation about the canted hinge axis C—C. The aft beam 25, which is positioned forward of the front spar 32, structurally supports the aft canted hinge 33 and the aft truss arm 34 which is pivotally connected thereto for rotation about the canted hinge axis D—D.

The upper structural skin panel 20 is also rigidly fastened to structurally support the screw drive actuation system through a forward screw support beam 35 and an aft screw support beam 36. As more clearly shown in the plan view of FIG. 5, the actuating screw drive mechanism for cambering the aerodynamic surface derives its power input through the chordwise drive input tube 37, which through universal joint 38 drives the bevel gear 39 in the aft gear assembly 40. The forward gear assembly 41 is coupled to the aft gear assembly 40 by a telescoping splined joint 42. The drive input to the forward gear assembly 41 is from the bevel gear 43 in the aft gear assembly 40 through the splined coupled 42, to the drive bevel gear 44 in the forward gear assembly. The drive input to the aft gear assembly 40 is also directed laterally to the aft spanwise drive screw 45 through the bevel gear 39 which engages another bevel gear 46 at right angles thereto. The bevel gear 46 rotates the spanwise screw 45 through a vertically arranged tier of spur gears as shown in FIG. 3, wherein the upper spur gear 47 is axially aligned and connected to bevel gear 46 and the lower spur gear 48 which is mounted on the aft drive screw 45 is in engagement with the upper spur gear 47. Similarly, the drive input to the forward gear assembly 41 is directed laterally to the forward spanwise drive screw 49 through bevel fear 44 which engages another bevel gear 50 at right angles thereto. The bevel gear 50 rotates the spanwise screw 49 through a vertically arranged tier of spur gears wherein the upper spur gear 51 is axially aligned and connected to bevel fear 50 and the lower spur gear 52 which is mounted on the forward drive screw 49 is in engagement with the upper spur gear 51. The forward and aft drive screws 49 and 45 are supported at spaced intervals spanwise by bearings 53 which are attached to the drive support beams 35 forward and 36 aft. Rotation of the forward and aft drive screws 49 and 45, laterally drive the forward and aft threaded drive nuts 54 and 55 respectively. The forward drive nut 54 is pivotally connected to the forward and mid truss arms 27 and 29 through self-aligning ball joints 56 and 57 respectively. Similarly, the aft drive is pivotally connected to the mid and aft truss arms 31 and 34 through self-aligning ball joints 58 and 59 respectively.

The wing surface is made to change its contour through the operation of the camber control mechanism which by rotation of the screw members, 49 forward and 45 aft, drive the threaded nuts, 54 forward and 55 aft, laterally and rotate the truss arms about their canted hinges. As the truss arms are rotated out of their chordwise alignment, the chordwise distances between the canted hinge axes on the lower surface or the distance between the hinge points on the lower surface, A to B and C to D, are shortened, causing the upper surface to bend and thereby increase airfoil camber. The lower surface comprises a fairing assembly incorporating a series of slip joints 22 to allow for the contraction of the under surface. The under surface is supported and tied to the upper structural panel 20 by stiffening channels 60 which are designed to open and close in a spring-like fashion as the wing chamber changes. The operation and kinematics of the camber control linkage is such as to form a rigid yet moveable trusswork.

While the invention has been disclosed with reference to a preferred embodiment, it is to be understood that modifications and changes which become obvious to a person skilled in the art as a result of the teachings hereof will be encompassed by the following claims:

What is claimed is:

1. A variable camber airfoil comprising: an upper surface; a contractable lower surface; a pair of canted hinges spaced chordwise and supported from the upper surface; a pair of truss members each pivotally mounted about one end on a canted hinge and having a pivotal interconnection at their other end; and actuating means for rotating the truss members about their canted hinges to bend the upper surface and contract the lower surface and thereby increase the camber of the airfoil.

2. The variable camber airfoil as set forth in claim 1, further including a stiffener channel extending spanwise between the pair of canted hinges; said contractable lower surface having an overlapping slip-joint; said stiffener channel having a closed end attached to the upper surface and having its open end extending therefrom to support the overlapping slip-joint of the lower surface; and said stiffener being designed to open and close in spring-like fashion as the degree of overlap changes due to airfoil camber variations.

3. A variable camber airfoil comprising: an upper surface; a contractable lower surface; a pair of parallel beams supported spanwise from the upper surface; a pair of canted hinges each mounted to one of said beams in chordwise alignment; a pair of truss members each pivotally mounted about one end on a canted hinge and having a pivotal interconnection at their other end; and actuating means for rotating the truss members about their canted hinges to bend the upper surface and contract the lower surface and thereby increase the camber of the airfoil.

4. A variable camber airfoil comprising: an upper surface; a contractable lower surface; a pair of parallel beams extending from the upper surface to the lower surface, being rigidly attached to the upper surface in a spanwise direction and supporting the lower surface therefrom; a pair of hinges, each mounted to a beam, having their axes parallel to the plane of the beam web and inclined in like direction spanwise from the vertical; a pair of truss members each pivotally mounted about one end, on one of said hinges and having a pivotal interconnection at their other end; and actuating means for rotating the truss members about their canted hinges so as to apply a chordwise contraction force between the pair of parallel beams to shorten the lower surface and bend the upper surface to increase its curvature thereby increasing the camber of the airfoil.

5. The variable camber airfoil as set forth in claim 4, further including a stiffener channel extending spanwise between the parallel beams; said contractable lower surface having an overlapping slip-joint; said stiffener channel being attached to the upper surface and extending therefrom to support the overlapping slip-joint of the lower surface; and said stiffener being designed to open and close in spring-like fashion as the degree of overlap changes due to airfoil camber variations.

6. A variable camber airfoil comprising: a structurally continuous upper surface; a nonstructural, slip-jointed lower surface; a pair of hinges spaced chordwise and structurally supported from the upper surface; said hinges having their axes canted in like direction spanwise from the vertical; a pair of truss members in chordwise alignment, each pivotally mounted about one end on a canted hinge and having a pivotal interconnection at their other end below the chord plane of the airfoil actuating means for moving the pivotal interconnection of the truss members spanwise to rotate the truss members about their canted hinges and apply a contraction force to the airfoil below its chord plane which due to the slip-jointed lower surface and the relatively non-contractable upper surface, applies a bending force to the upper surface to increase its curvature thereby increasing the camber of the airfoil.

7. A variable camber airfoil comprising: an upper surface; a contractable lower surface; a pair of hinges spaced chordwise and supported from the upper surface; said hinges having their axis canted spanwise from the vertical; a pair of truss members each pivotally mounted about one end on a canted hinge and having a pivotal interconnection at their other end; said pivotal interconnection being translationally supported from the upper surface, and actuating means for rotating the truss members about their canted hinges to apply forces between the pair of hinges contracting the lower surface and bending the upper surface to increase its curvature and thereby increase the camber of the airfoil.

* * * * *